(12) United States Patent
Watanabe

(10) Patent No.: US 7,119,939 B2
(45) Date of Patent: Oct. 10, 2006

(54) PHASE MODULATION CIRCUIT, TEST APPARATUS, AND COMMUNICATION SYSTEM

(75) Inventor: Daisuke Watanabe, Tokyo (JP)

(73) Assignee: Advantest Corporation, Tokyo (JP)

( * ) Notice: Subject to any disclaimer, the term of this patent is extended or adjusted under 35 U.S.C. 154(b) by 185 days.

(21) Appl. No.: 10/887,637

(22) Filed: Jul. 9, 2004

(65) Prior Publication Data

US 2004/0247325 A1 Dec. 9, 2004

Related U.S. Application Data

(63) Continuation of application No. PCT/JP03/00094, filed on Jan. 9, 2003.

(30) Foreign Application Priority Data

Jan. 9, 2002 (JP) ............................. 2002-002350

(51) Int. Cl.
G02F 1/01 (2006.01)
H04B 10/12 (2006.01)
H01S 3/10 (2006.01)
H03C 1/50 (2006.01)

(52) U.S. Cl. .................... 359/279; 398/188; 398/192; 398/195; 372/26; 372/38.07; 332/152; 332/178

(58) Field of Classification Search ................ 359/279, 359/288, 237–239; 398/188, 192, 195; 372/26, 372/38.07; 332/144, 152, 178, 183
See application file for complete search history.

(56) References Cited

U.S. PATENT DOCUMENTS

| 4,081,670 A | * | 3/1978 | Albanese ................. 372/38.07 |
| 4,805,235 A | * | 2/1989 | Henmi ....................... 398/195 |
| 5,073,331 A | * | 12/1991 | Shirasaki ..................... 372/26 |
| 5,119,039 A | * | 6/1992 | Olshansky et al. ......... 359/346 |
| 5,317,443 A | * | 5/1994 | Nishimoto .................. 398/195 |
| 5,325,382 A | * | 6/1994 | Emura et al. ................. 372/26 |
| 5,379,144 A | * | 1/1995 | Shirasaki ..................... 398/192 |
| 5,398,008 A | * | 3/1995 | Nissler et al. .............. 332/178 |
| 5,999,300 A | * | 12/1999 | Davies et al. ............... 398/185 |
| 2002/0008892 A1 | | 1/2002 | Okayasu et al. |

FOREIGN PATENT DOCUMENTS

JP 52-152771 12/1977

(Continued)

OTHER PUBLICATIONS

Patent Abstracts of Japan, Publication No. 52-152771 dated Dec. 19, 1977, 1 pg.

(Continued)

Primary Examiner—Loha Ben
(74) Attorney, Agent, or Firm—Osha Liang LLP

(57) ABSTRACT

A phase modulation circuit for outputting a modulated signal of an input signal which has been modulated to a desired phase. The circuit includes a light emitting element for emitting light according to an input signal and outputting a modulated signal, a bias current source for supplying in advance to a light emitting element a bias current smaller than the light emitting threshold current of the light emitting element, a bias current control unit for controlling the bias current according to a desired phase for supplying to the light emitting element a modulation current for causing the light emitting element to emit light according to the input signal, and a modulation current control unit for controlling the modulation current according to the phase shift resolution in the phase modulation circuit. The modulation current control unit controls modulation current further according to the phase range in the phase modulation circuit.

15 Claims, 13 Drawing Sheets

FOREIGN PATENT DOCUMENTS

| | | |
|---|---|---|
| JP | 62-81073 | 4/1987 |
| JP | 5-30020 | 2/1993 |
| JP | 5-273278 | 10/1993 |
| JP | 9-289490 | 11/1997 |
| JP | 2000-156540 | 6/2000 |
| JP | 2001-203642 | 7/2001 |

OTHER PUBLICATIONS

Patent Abstracts of Japan, Publication No. 62-081073 dated Apr. 14, 1987, 1 pg.

Patent Abstracts of Japan, Publication No. 2000-156540 dated Jun. 6, 2000, 1 pg.

Patent Abstracts of Japan, Publication No. 2001-203642 dated Jul. 27, 2001, 1 pg.

Patent Abstracts of Japan, Publication No. 05-273278 dated Oct. 22, 1993, 1 pg.

Patent Abstracts of Japan, Publication No. 05-030020 dated Feb. 5, 1993, 1 pg.

Patent Abstracts of Japan, Publication No. 09-289490 dated Nov. 4, 1997, 1 pg.

International Search Report mailed Feb. 18, 2003 in PCT Application No. WO 03/061160, 3 pages.

\* cited by examiner

| LIGHT EMITTING ELEMENT | PHASE SHIFT RESOLUTION | PHASE SHIFT RANGE |
|---|---|---|
| 32a | 0.02ns | 0.0~0.2ns |
| 32b | 0.04ns | 0.0~0.4ns |
| ⋮ | ⋮ | ⋮ |

FIG. 8

PHASE MODULATION CIRCUIT, TEST APPARATUS, AND COMMUNICATION SYSTEM

The present application is a continuation application of PCT/JP03/00094 filed on Jan. 9, 2003 which claims the benefit of, and priority from, Japanese patent application No. 2002-2350 filed on Jan. 9, 2002, the entire contents of which are incorporated herein by reference for all purposes.

FIELD OF THE INVENTION

The present invention relates to a phase modulation circuit for modulating the phase of an input signal to a desired phase, a test apparatus for testing an electronic device and a communication system for transmitting communication data. More particularly, the present invention relates to a phase modulation circuit using a light emitting element.

RELATED ART

A conventional test apparatus for testing an electronic device such as a semiconductor device is provided with a phase modulation circuit for modulating the phase of an input signal to a desired phase. In the phase modulation circuit, an electric circuit such as a PLL is used.

The PLL compares the phase of the input signal with a desired phase of a reference signal and modulates the phase of the input signal to the desired phase. And the phase modulation circuit performs the phase modulation by delaying a reference clock as much as desired time with a delay circuit in order to generate the reference signal. The delay circuit, which has a plurality of delay elements, generates a desired delay time by passing the input signal to one of the delay elements based on a delay setting value and the information stored in the linearization memory. The delay element consists of electric circuit elements such as buffers.

As the electronic device recently becomes highly precise and speedy, however, the test apparatus for the test of the electronic device also need to be so. Nevertheless, the phase modulation circuit having the delay circuit using the conventional electric circuit elements and the test apparatus almost reach the limitation of being higher precise and speedy, so the phase modulation by new means is desired. Further in the configuration of a highly precise delay circuit, it is difficult to realize the variable delay in which linearity is extremely excellent.

SUMMARY OF THE INVENTION

Accordingly, it is an object of the present invention to provide a timing generating apparatus and a test apparatus, which is capable of overcoming the above drawbacks accompanying the conventional art. The above and other objects can be achieved by combinations described in the independent claims. The dependent claims define further advantageous and exemplary combinations of the present invention.

In order to solve the problems above, according to the first aspect of the present invention, a phase modulation circuit for outputting a modulation signal, which results from modulating a phase of an input signal to a desired phase, includes a first light emitting element for emitting light according to the input signal and outputting a light emitting signal as the modulation signal and a first bias current source for supplying in advance the first light emitting element with a bias current, which is smaller than a light emitting threshold current whereby the first light emitting element starts to emit light.

The phase modulation circuit may further include a bias current control unit for controlling the bias current of the bias current source based on the desired phase. The phase modulation circuit may further include a modulation current source for supplying the first light emitting element with a modulation current to make the first light emitting element emit light according to the input signal and a modulation current control unit for controlling the modulation current of the modulation current source based on a phase modulation resolution of the phase modulation circuit.

The modulation current control unit may control the modulation current of the modulation current source further based on a variable phase modulation range of the phase modulation circuit. The bias current control unit may control the bias current of the bias current source further based on temperature of the first light emitting element.

The phase modulation circuit may further include a temperature control unit for heating or cooling the first light emitting element. The temperature control unit may heat or cool the first light emitting element based on a variable phase modulation range of the phase modulation circuit.

The phase modulation circuit may further include a photoelectric conversion unit for converting the light emitting signal outputted by the first light emitting element into an electrical signal and outputting the electrical signal as the modulation signal. The phase modulation circuit may further include a second light emitting element, whose interband transition time constant is different from the first light emitting element, for emitting light according to the input signal and outputting a light emitting signal as the modulation signal and a second bias current source for supplying in advance the second light emitting element with a bias current, which is smaller than a light emitting threshold current whereby the second light emitting element starts to emit light.

The first and second light emitting elements may be laser diodes, and base materials of the first and second light emitting elements may be different. The phase modulation circuit may further include a selecting unit for supplying the input signal to either the first or second light emitting element based on the desired phase. The first and second light emitting elements may receive first and second corresponding input signals and output the modulation signals according to the input signals received respectively.

According to the second aspect of the present invention, a test apparatus for testing an electronic device includes a pattern generating unit for generating a test signal to test the electronic device, a phase modulation circuit for supplying the electronic device with a modulation signal, which results from modulating a phase of the test signal to a desired phase, and a judgment unit for judging quality of the electronic device based on an output signal, which the electronic device outputs based on the modulation signal, wherein the phase modulation circuit includes a first light emitting element for emitting light according to the test signal and outputting a light emitting signal as the modulation signal and a bias current control unit for supplying in advance the first light emitting element with a bias current, which is smaller than a light emitting threshold current whereby the first light emitting element starts to emit light.

According to the third aspect of the present invention, a communication system for transmitting communication data includes a transmission unit for outputting the communication data, a phase modulation circuit for receiving the communication data and modulating a phase of the communication data to a desired phase, a communication path for transmitting the communication data phase-modulated by the phase modulation circuit, and a receiving unit for receiving the communication data phase-modulated by the phase modulation circuit and demodulating the communication data received, wherein the phase modulation circuit includes a first light emitting element for emitting light according to the communication data received and outputting a light emitting signal as the communication data phase-modulated and a first bias current source for supplying in advance the first light emitting element with a bias current, which is smaller than a light emitting threshold current whereby the first light emitting element starts to emit light.

The transmission unit may output an optical signal as the communication data, the phase modulation circuit may further include a photoelectric conversion unit for converting the communication data of an optical signal into the communication data of an electrical signal, and the first light emitting element may emit light according to the communication data of an electric signal.

The summary of the invention does not necessarily describe all necessary features of the present invention. The present invention may also be a sub-combination of the features described above.

BRIEF DESCRIPTION OF THE DRAWINGS

FIG. 8 shows an example of a characteristics table.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
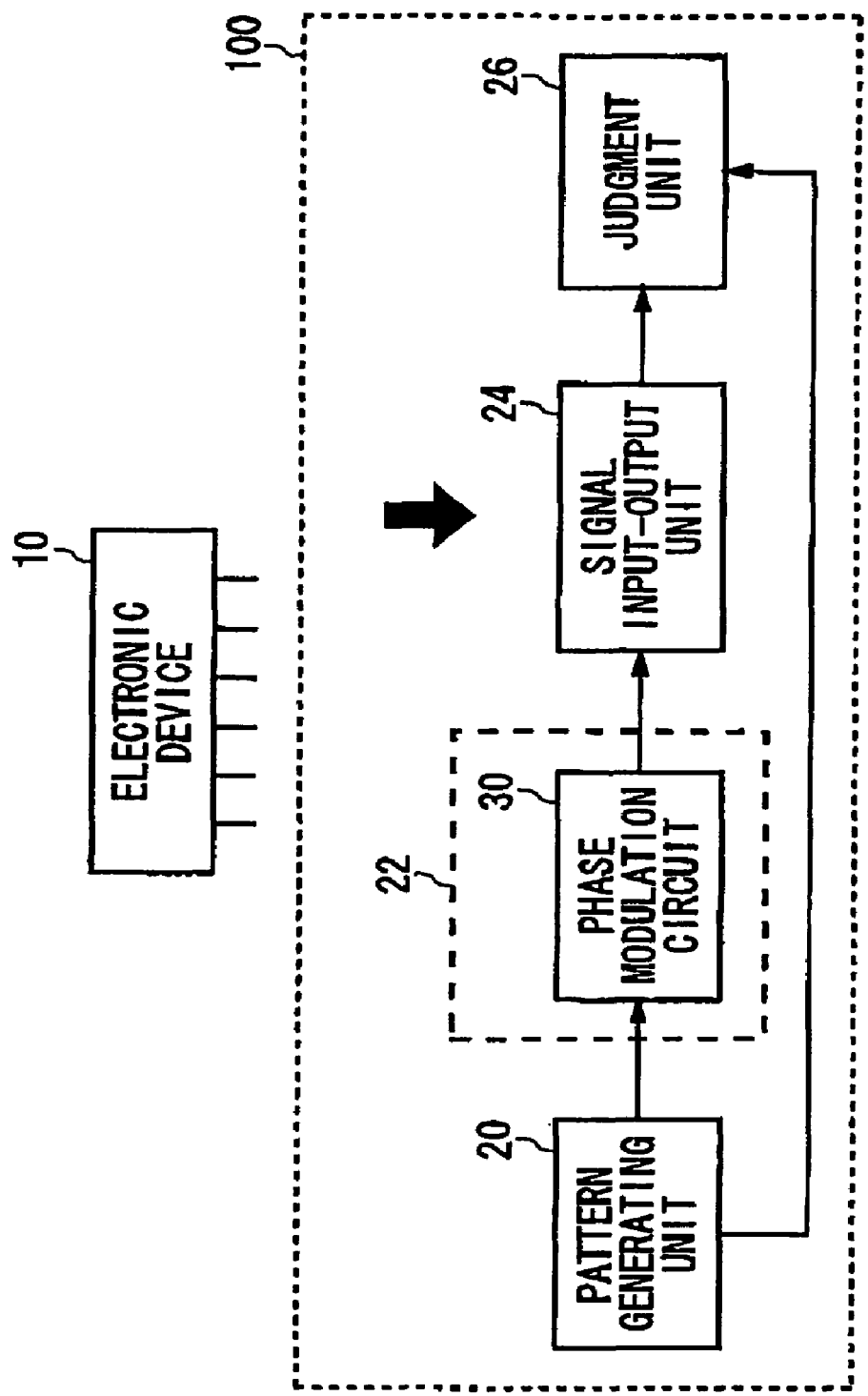
FIG. 1 shows an example of the configuration of a test apparatus 100 related to this invention.

FIG. 1 shows an example of the configuration of a test apparatus 100 related to this invention. The test apparatus 100 tests an electronic device 10. The test apparatus 100 is provided with a pattern generating unit 20, a waveform formatting unit 22, a signal input-output unit 24, and a judgment unit 26. The pattern generating unit 20 generates a test signal for the test of the electronic device 10 and supplies it to the waveform formatting unit 22.

The waveform formatting unit 22 formats the test signal received and supplies the test signal formatted to the electronic device 10 via the signal input-output unit 24. The waveform formatting unit 22 includes a phase modulation circuit 30 for modulating the phase of the test signal to a desired phase. The phase modulation circuit 30 may modulate the phase of the test signal based on a test pattern to test the electronic device 10. The signal input-output unit 24 supplies the test signal to the electronic device 10 and receives the output signal outputted by the electronic device 10 based on the test signal. The signal input-output unit 24 supplies the output signal received to the judgment unit 26.

The judgment unit 26 judges the quality of the electronic device 10 based on the output signal outputted by the electronic device 10 according to the test signal. The judgment unit 26 may judge the quality of the electronic device 10 by comparing an expected signal to be outputted by the electronic device 10 based on the test signal and the output signal outputted by the electronic device 10. In this case, the pattern generating unit 20 may generate the expected signal based on the test signal generated and supply it to the judgment unit 26.

Figure 2:
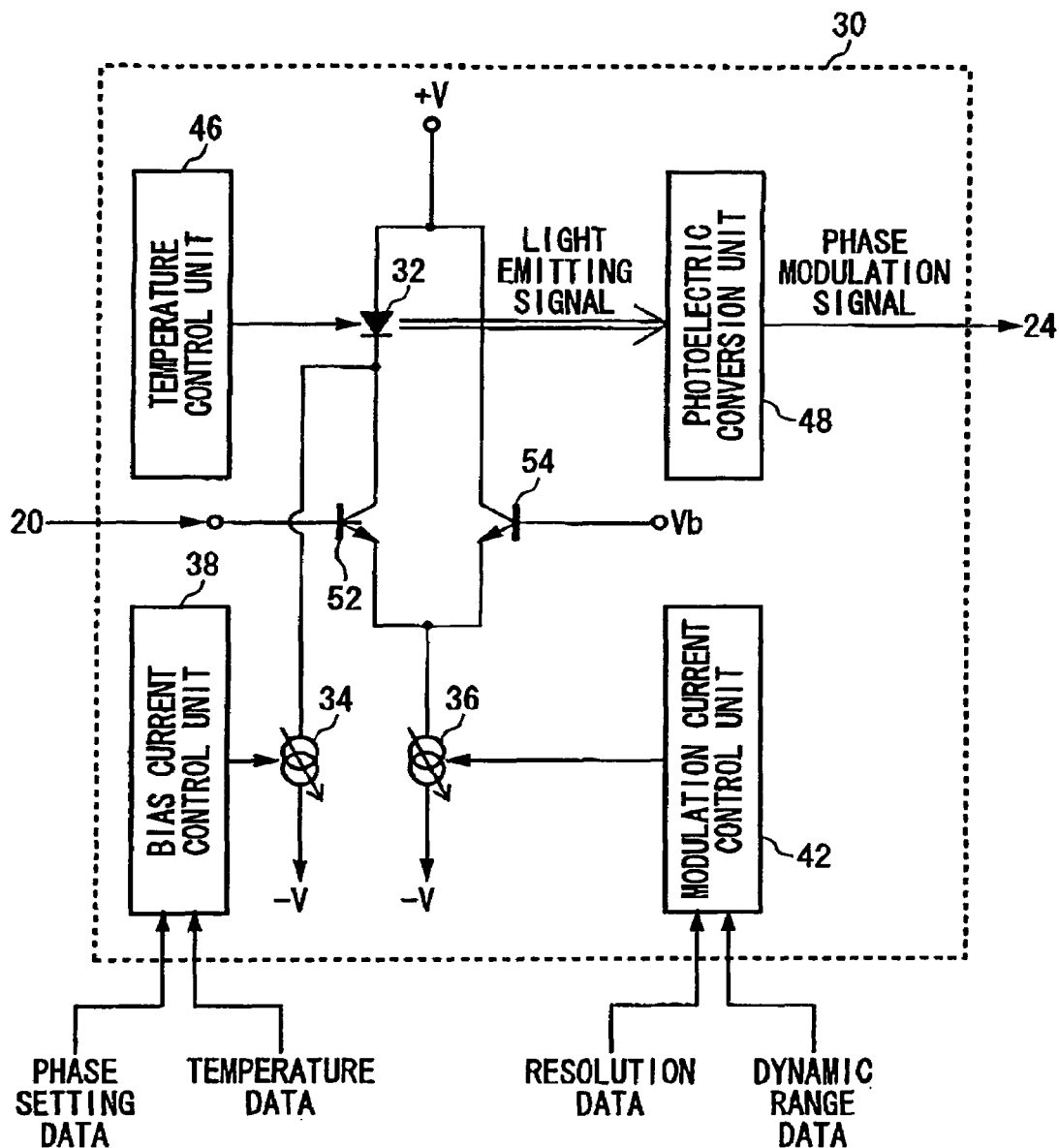
FIG. 2 shows an example of the configuration of a phase modulation circuit 30.

FIG. 2 shows an example of the configuration of the phase modulation circuit 30. The phase modulation circuit 30 outputs a modulation signal which results form delaying the input signal by a desired time. In this embodiment, the phase modulation circuit 30 receives the test signal as the input signal and supplies the modulation signal, which results from modulating the phase of the test signal to a desired phase, to the signal input-output unit 24 as the test signal. The phase modulation circuit 30 is provided with a light emitting element 32, a bias current source 34, a modulation current source 36, a bias current control unit 38, a modulation current control unit 42, a temperature control unit 46, a photoelectric conversion unit 48, and transistors (52, 54).

The light emitting element 32 emits light according to the input signal and outputting a light emitting signal as the modulation signal. The bias current source 34 supplies a forward bias current, which is smaller than a light emitting threshold current whereby the light emitting element 32 starts to emit light, to the light emitting element 32. Accordingly, the bias current caused by the bias current source 34 flows in the light emitting element 32. The amount of the bias current can be controlled in a programmable manner. The light emitting element 32 may be a laser diode.

The bias current control unit 38 controls the bias current of the bias current source 34 based on the phase setting data indicating a desired phase to which the input signal should be modulated. For example, the bias current control unit 38 may receive the phase setting data based on the phase setting value set by a user. And the bias current control unit 38 may include a bias data memory for storing the phase setting data and the data indicating the amount of the bias current to generate the phase indicated by the phase setting data in a corresponding manner and a digital-to-analog converter for converting the digital data stored in the bias data memory into the analog data. In this case, the bias current control unit 38 controls the bias current based on the data stored in the bias data memory.

Although the light emitting element 32 emits light according to the input signal, a light emission delay caused by the light emitting element 32 occurs until the light emitting element 32 emits light from when the phase modulation circuit 30 receives the input signal. The light emission delay time of the light emitting element 32 is determined based on the bias current flowing in the light emitting element 32 as described later in connection with FIG. 5. As the bias current control unit 38 controls the bias current, the light emission delay time of the light emitting element 32 can be controlled, so that it is possible to generate the signal modulated to have a desired phase. The phase modulation circuit 30 generates a modulation signal whose phase information lies on its leading edge.

And the bias current control unit 38 controls the bias current of the bias current source 34 further based on the temperature data indicating the temperature of the light emitting element 32. As described later in connection with FIG. 6, the light emission delay time of the light emitting element 32 depends on the temperature of the light emitting element 32. By controlling the bias current of the bias current source 34 based on the temperature of the light emitting element 32, it is possible to reduce the error of the delay time due to the temperature change of the light emitting element 32. The bias current control unit 38 controls the bias current of the bias current source 34 to be the current value resulting from multiplying the current value, which is indicated by the data of the bias data memory corresponding to the phase setting data, by the coefficient based on the temperature of the light emitting element 32. The bias data memory may further store the coefficient corresponding to the temperature of the light emitting element 32.

The modulation current source 36 supplies the light emitting element 32 with a forward modulation current to make the light emitting element 32 emit light according to the input signal. The modulation current source 36 is electrically coupled to the light emitting element 32 via the transistor 52. The transistor 52 receives the input signal in its base and makes the modulation current flow in the light emitting element 32 according to the input signal. In other words, the modulation current source 36 supplies the modulation current amplified from the input signal to the light emitting element 32.

The modulation current control unit 42 controls the modulation current of the modulation current source 36 based on the resolution data indicating the phase shift resolution of the phase of the modulation signal in the phase modulation circuit 30. In other words, the modulation current control unit 42 controls the modulation current according to the phase shift resolution required to the phase modulation circuit 30. As described later in connection with FIG. 5, by controlling the modulation current flowing in the light emitting element 32, it is possible to control the resolution of the light emission delay time of the light emitting element 32. Accordingly, by controlling the modulation current flowing in the light emitting device 32, it is possible to control the phase shift resolution of the phase modulation circuit 30. The modulation current control unit 42 may include a modulation data memory for storing the current value of the modulation current in order that the current value corresponds to the phase shift resolution of the phase modulation circuit 30 and a digital-to-analog converter for converting the digital data stored in the modulation data memory into the analog data.

And the modulation current control unit 42 may control the modulation current of the modulation current source 36 based on the dynamic range data indicating the phase shift range of the phase of the modulation signal in the phase modulation circuit 30. As described later in connection with FIG. 5, by controlling the modulation current flowing in the light emitting element 32, it is possible to control the variable range of the light emission delay time of the light emitting element 32. Accordingly, by controlling the modulation current flowing in the light emitting device 32, it is possible to control the phase shift range of the phase modulation circuit 30. The modulation data memory described above may store the current amount of the modulation current in order that the current amount corresponds to the phase shift range of the phase modulation circuit 30.

The temperature control unit 46 heats or cools the light emitting element 32. For example, the temperature control unit 46 may heat or cool the light emitting element 32 in order to hold the temperature of the light emitting element 32 to be constant. By controlling the temperature of the light emitting element 32, it is possible to reduce the error of the delay time due to the temperature change of the light emitting element 32 and the phase error of the phase modulation circuit 30.

And the temperature control unit 46 may heat or cool the light emitting element 32 based on the phase shift range of the phase modulation circuit 30. By controlling the temperature of the light emitting element 32, it is possible to control the light emitting threshold current of the light emitting element 32. Accordingly, as described later in connection with FIG. 6, by controlling the temperature of the light emitting element 32, it is possible to control the variable range of the light emission delay time of the light emitting element 32. That is, by controlling the temperature of the light emitting element 32, it is possible to control the phase shift range of the phase modulation circuit 30. The temperature control unit 46 may include a temperature data memory for storing the temperature of the light emitting element 32 and the phase shift range of the phase modulation circuit 30 in a corresponding manner and a digital-to-analog converter for converting the digital data stored in the temperature data memory into the analog data.

The transistor 54 is given a base voltage Vb at its base terminal. If the input signal of the variable phase modulation circuit 30 is a digital signal, the base voltage Vb is preferably the voltage value indicating the intermediate level between the H and L logic levels of a digital signal. The input signal is inputted to the base terminal of the transistor 52. And the signals given to the base terminal of the transistors 52 and 54 may be differential signals based on the input signal. If the input signal to the transistor 52 indicates the H logic, the transistor 54 is in the cut-off state, the modulation current flows in the transistor 52, and the sum of the bias current and the modulation current flows in the light emitting element 32. And if the input signal indicates the L logic, the transistor 52 is in the cut-off state, the modulation current flows in the transistor 54, and the bias current flows in the light emitting element 32. As above, by performing the switching control of the current flowing in the light emitting element 32, it is possible to control the current flowing in the light emitting element 32 with higher precision.

The photoelectric conversion unit 48 converts the light emitting signal outputted by the light emitting element 32 into an electrical signal and outputs the electrical signal as the modulation signal. The photoelectric conversion unit 48 may be a circuit provided with a photodiode.

According to the phase modulation circuit 30 as described above, by utilizing the light emission delay time of the light emitting element 32, it is possible to modulate the phase of the input signal to a desired phase. And by controlling the bias current supplied to the light emitting element 32, the modulation current and the temperature of the light emitting element 32, it is possible to modulate the phase of the input signal with desired phase shift resolution and a phase shift range.

And according to the test apparatus 100, it is possible to easily generate the test signal in response to a desired test pattern and supply it to the electronic device 10. For example, as the bias current control unit 38 controls the bias current of the bias current source 34 in real time in response to the desired test pattern, it is possible to easily control the phase of each rectangular waveform of the test signal and generate a desired test signal.

Figure 3:
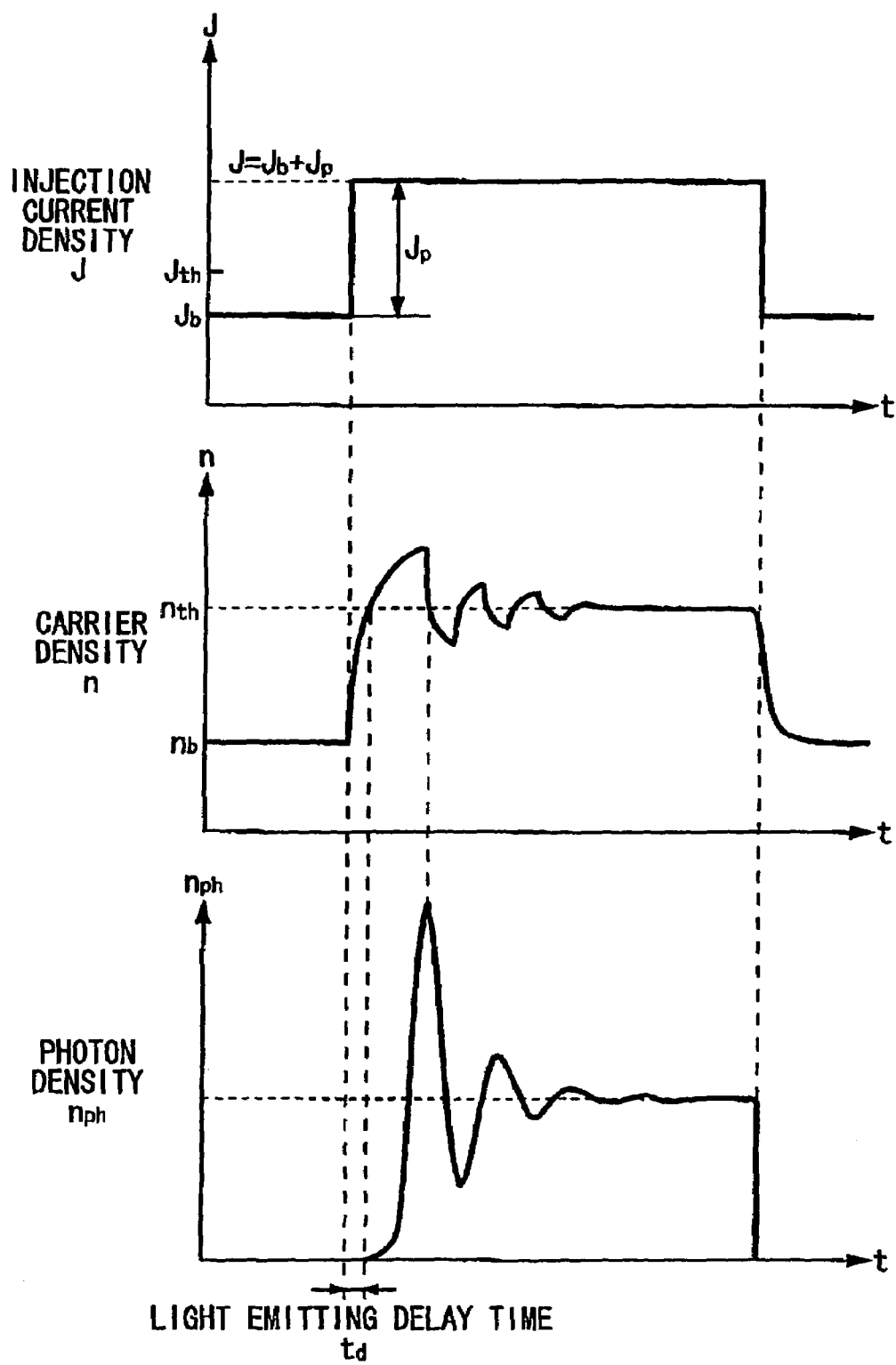
FIG. 3 shows the principle of a light emission delay time of a light emitting element 32.

FIG. 3 shows the principle of the light emission delay time of the light emitting element 32. In this embodiment, the light emitting element 32 is a laser diode. In FIG. 3, $J_{th}$ represents the light emitting threshold current density of the light emitting element 32. As shown by the graph on top of FIG. 3, if a current of current density $J_b$, which is smaller than the light emitting threshold current density $J_{th}$, flows in the light emitting element 32, the injection carrier density of the light emitting element 32 becomes $n_b$ which is smaller than the light emitting threshold carrier density $n_{th}$ as shown by the graph in the middle of FIG. 3.

In this state, when the modulation current of current density $J_p$ is supplied to the light emitting element 32, the injection carrier density of the light emitting element 32 increases at the time constant $\tau_n$. When the time td lapses from when the modulation current is supplied and the injection carrier density reaches the light emitting threshold carrier density $n_{th}$, the light emitting element 32 starts the laser oscillation, and the photon density starts to increase as shown in the bottom of FIG. 3. The time $t_d$ becomes the light emission delay time of the light emitting element 32.

Here, the light emission delay time $t_d$ is given by the following equation:

$$t_d = \tau_n \ln\left(\frac{J - J_b}{J - J_{th}}\right) = \tau_n \ln\left(\frac{I_p}{I_p + I_b - I_{th}}\right)$$

where, J denotes the injection carrier density, $I_p$ denotes the modulation current, $I_b$ denotes bias current, and $I_{th}$ denotes the light emitting threshold current. As obvious from the above equation, by controlling the modulation current, the bias current, and the light emitting threshold current, it is possible to control the light emission delay time of the light emitting element 32.

Figure 4:
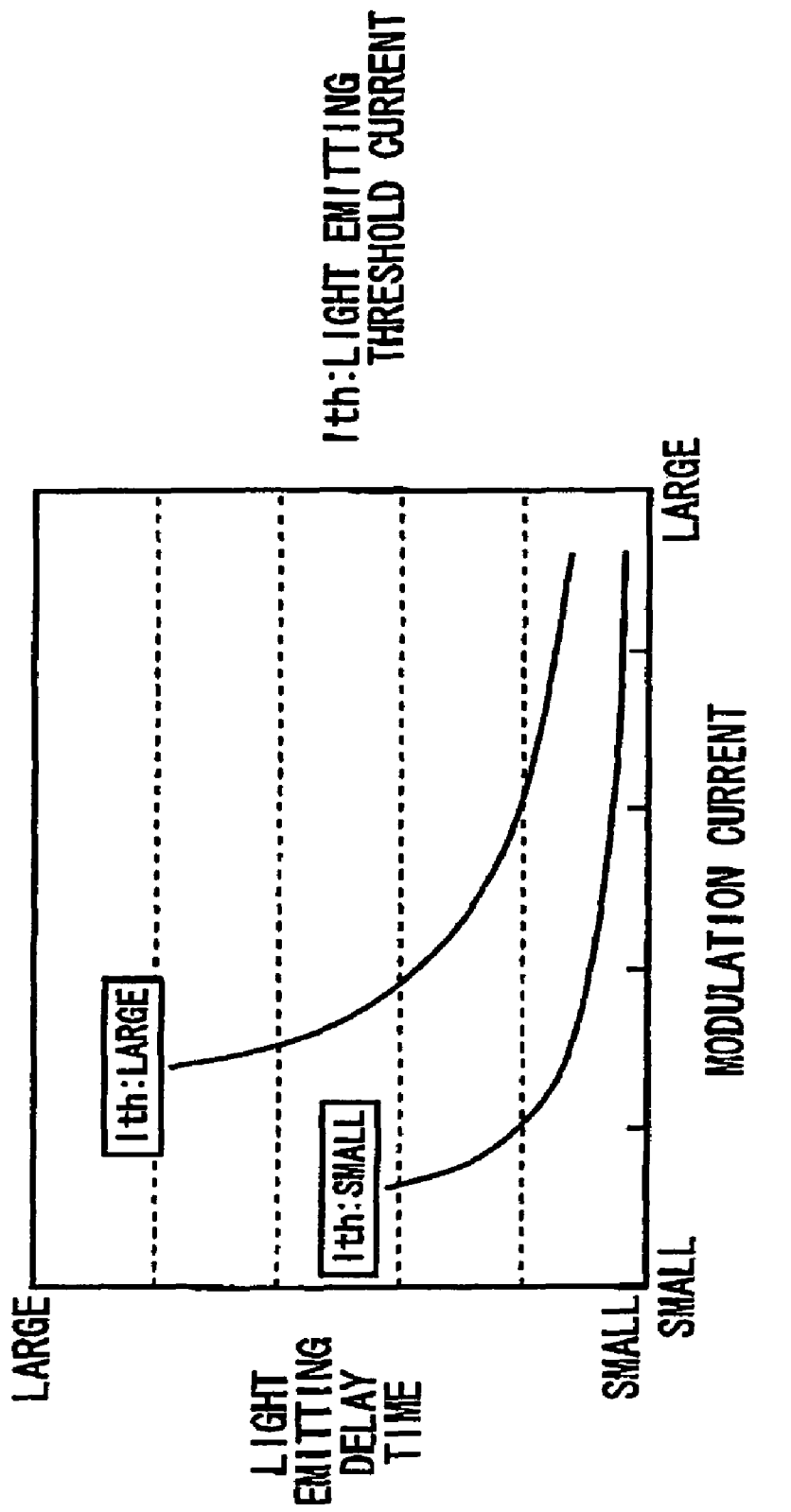
FIG. 4 shows an example of the relation between a modulation current and a light emitting threshold current of the light emitting element 32 and the light emission delay time.

FIG. 4 shows an example of the relation between the modulation current and the light emitting threshold current of the light emitting element 32 and the light emission delay time. In FIG. 4, the horizontal axis represents the modulation current, and the vertical axis represents the light emission delay time. As shown in FIG. 4, if the modulation current increases, the light emission delay time of the light emitting element 32 decreases, and if the light emitting threshold current $I_{th}$ increases, the light emission delay time of the light emitting element 32 increases.

Figure 5:
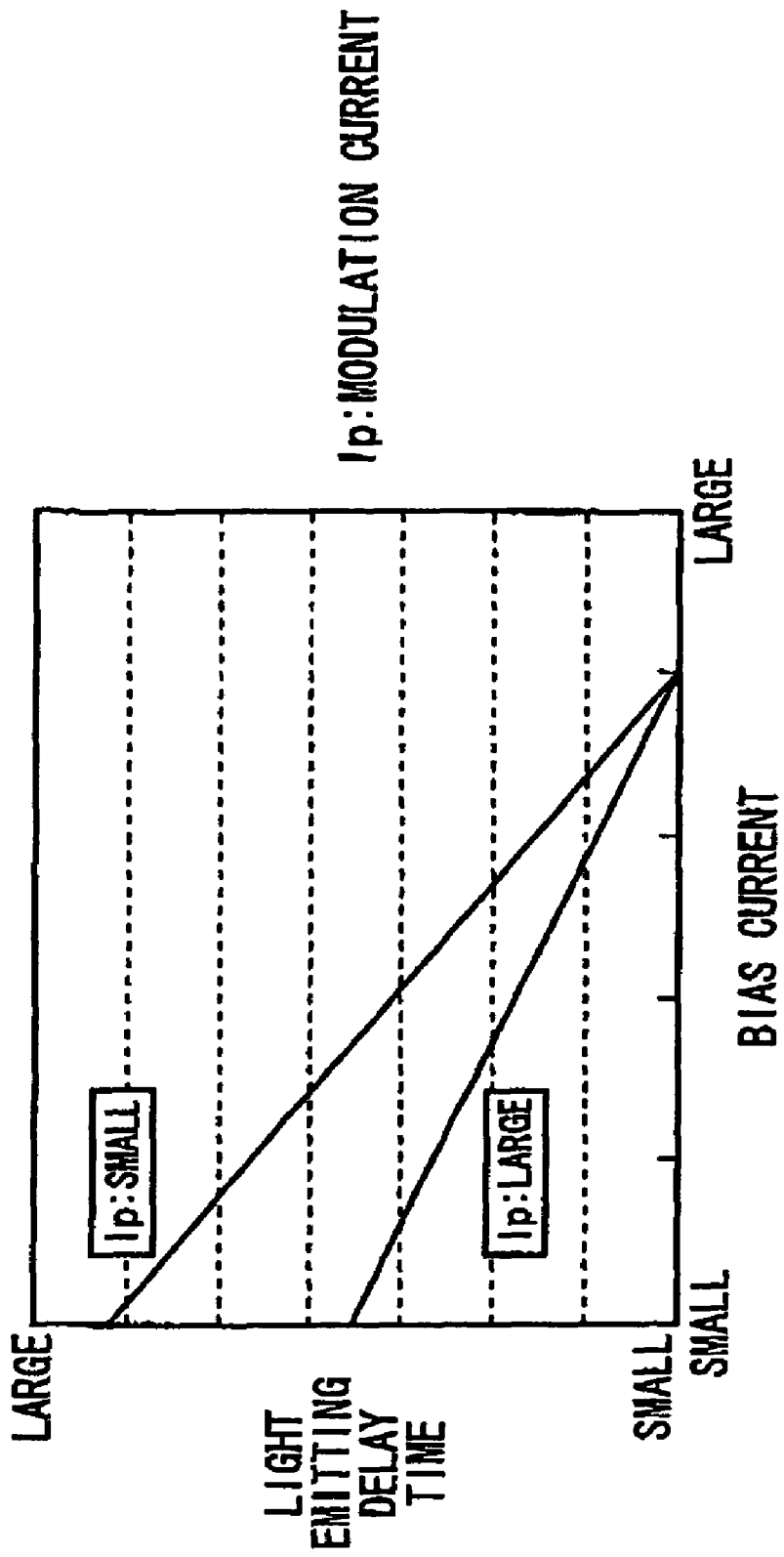
FIG. 5 shows the relation between a bias current and the modulation current of the light emitting element 32 and the light emission delay time.

FIG. 5 shows the relation between the bias current and the modulation current of the light emitting element 32 and the light emission delay time. In FIG. 5, the horizontal axis represents the bias current, and the vertical axis represents the light emission delay time. As shown in FIG. 5, if the modulation current $I_p$ is fixed and the bias current increases, the light emission delay time of the light emitting element 32 linearly decreases.

In the phase modulation circuit 30 described in connection with FIG. 2, the bias current is controlled and thereby the light emission delay time of the light emitting element 32 is controlled. Since the light emission delay time linearly changes to the bias current, by controlling the bias current, it is possible to control the phase modulation of the input signal of the phase modulation circuit 30 with high precision.

And in the phase modulation circuit 30 described in connection with FIG. 2, the modulation current is controlled and thereby the phase shift resolution and the phase shift range of the light emitting element 32 is controlled. As shown in FIG. 5, if the modulation current increases, the phase shift range of the light emitting element 32 decreases. And in case that the bias current is changed with a predetermined gray scale and the phase of the input signal is modified to a desired phase, if the modulation current increases, the phase shift amount of the bias current per each gray scale decreases. That is, by controlling the modulation current, it is possible to control the phase shift resolution of the phase modulation circuit 30.

Figure 6:
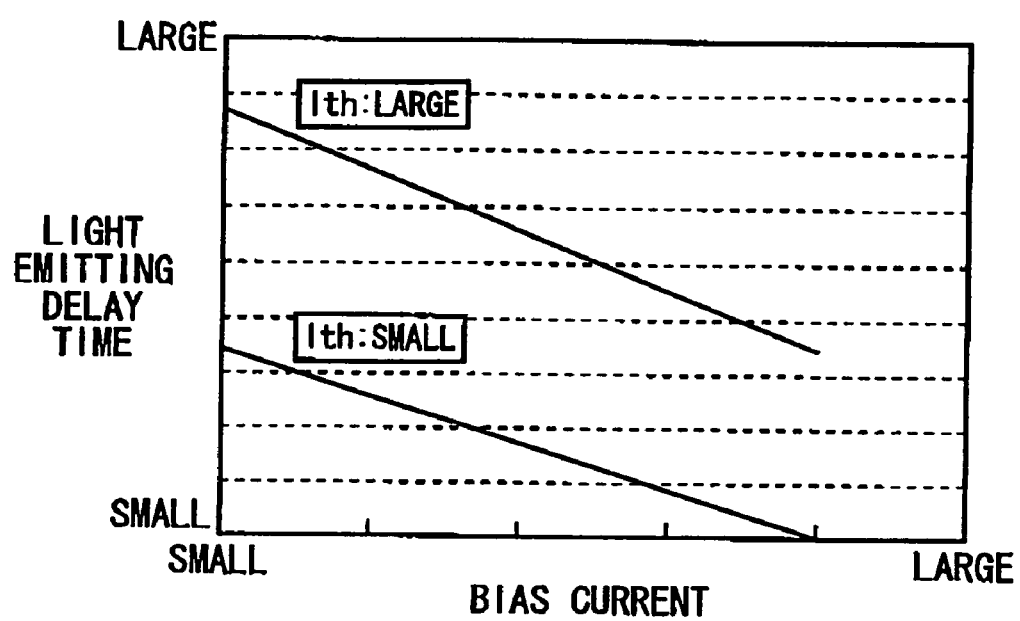
FIG. 6 shows the relation between the bias current and the light emitting threshold current of the light emitting element 32 and the light emission delay time.

FIG. 6 shows the relation between the bias current and the light emitting threshold current of the light emitting element 32 and the light emission delay time. In FIG. 6, the horizontal axis represents the bias current, and the vertical axis represents the light emission delay time. As shown in FIG. 6, if the bias current changes in the same range, when the light emitting threshold current $I_{th}$ increases, the variable range of the light emission delay time of the light emitting element 32 shifts in the increase direction. In other words, by controlling the light emitting threshold current $I_{th}$ of the light emitting element 32, it is possible to control the variable range of the light emission delay time of the light emitting element 32. The phase modulation circuit 30 described in connection with FIG. 2 controls the temperature of the light emitting element 32, the light emitting threshold current of the light emitting element 32 and the phase shift range of the phase modulation circuit 30.

Figure 7:
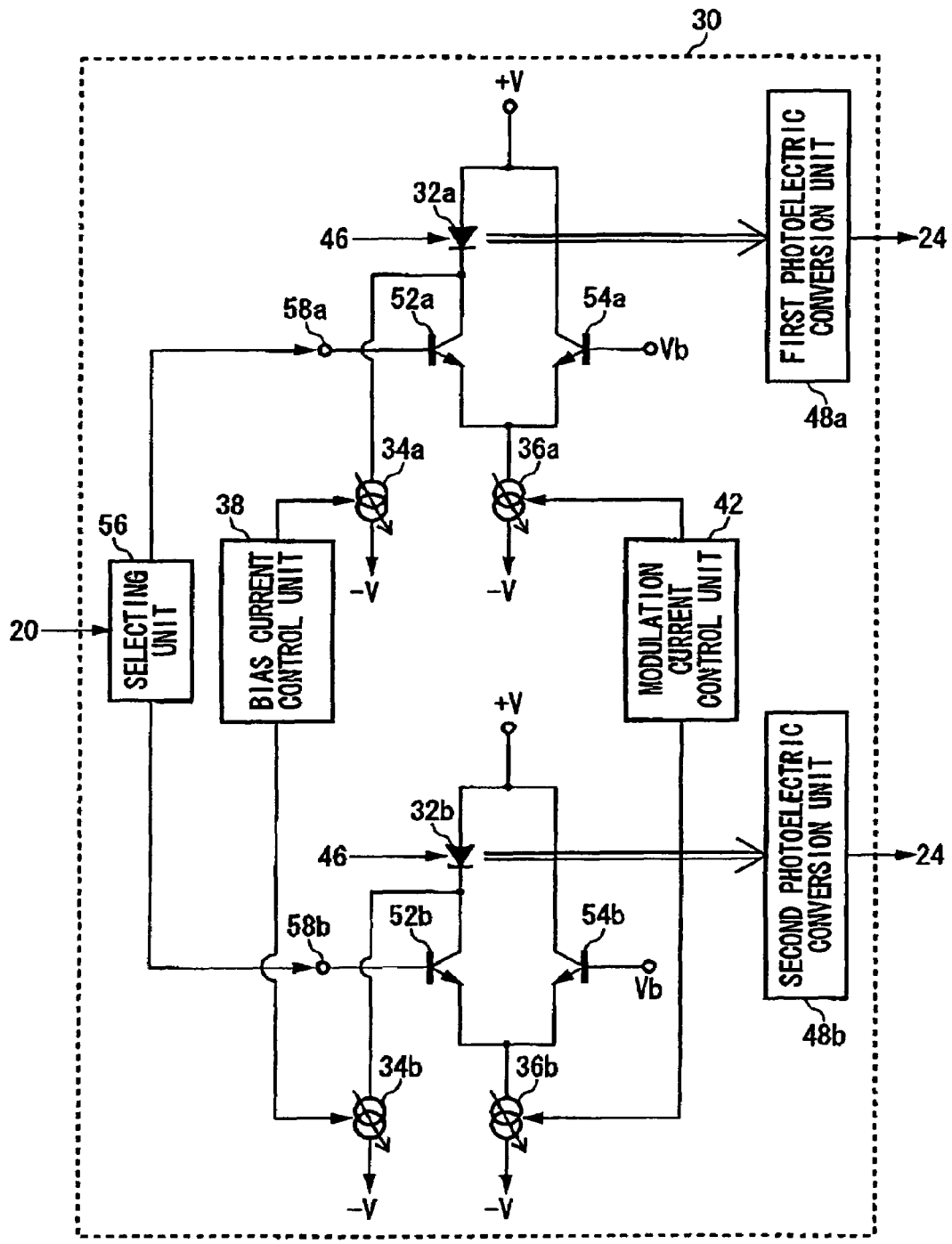
FIG. 7 shows another example of the configuration of the phase modulation circuit 30.

FIG. 7 shows another example of the configuration of the phase modulation circuit 30. The phase modulation circuit 30 is provided with a plurality of light emitting elements 32, a plurality of bias current sources 34, a plurality of modulation current sources 36, a bias current control unit 38, a modulation current control unit 42, a temperature control unit 46, a plurality of photoelectric conversion units 48, a plurality of transistors (52, 54), and a selecting unit 56. In FIG. 7, the matters given the same symbols as those in FIG. 2 have the same or similar function and configuration as those described in connection with FIG. 2. In this embodiment, the phase modulation circuit 30 is provided with a first light emitting element 32a, a second light emitting element 32b, a first bias current source 34a, a second bias current source 34b, a first photoelectric conversion unit 48a, a second photoelectric conversion unit 48b, a first transistor 52a, a second transistor 52b, a third transistor 54a, and a fourth transistor 54b.

The first and second light emitting elements 32a and 32b have the same or similar function and configuration as the light emitting element 32 described in connection with FIG.

2. The second light emitting element 32*b* has an interband transition time constant $\tau_n$ different from that of the first light emitting element 32*a*.

The first and second bias current sources 34*a* and 34*b* have the same or similar function and configuration as the bias current source 34 described in connection with FIG. 2. The first and second bias current sources 34*a* and 34*b* supply in advance the corresponding light emitting element 32 with the bias current smaller than the light emitting threshold current of the corresponding light emitting element 32.

The first and second modulation current sources 36*a* and 36*b* have the same or similar function and configuration as the modulation current source 36 described in connection with FIG. 2. The first and second modulation current sources 36*a* and 36*b* supply the corresponding light emitting element 32 with the modulation current according to the input signal. The first and second photoelectric conversion units 48*a* and 48*b* have the same or similar function and configuration as the photoelectric conversion unit 48 described in connection with FIG. 2.

The selecting unit 56 selects either the first or second light emitting element 32*a* or 32*b* to be supplied with the input signal based on a desired phase to which the input signal should be modulated in the phase modulation circuit 30. In this embodiment, the selecting unit 56 selects either the first or second light emitting element 32*a* or 32*b* to be supplied with the modulation current based on the input signal. The selecting unit 56 supplies the input signal to the base terminal 58 of the transistor 52 corresponding to the light emitting element 32 selected. The first and second light emitting elements 32*a* and 32*b* have their interband transition time constants $\tau_n$ different from each other. Accordingly, as described later in connection with FIG. 9, the phase shift resolution and the phase shift range of the first light emitting element 32*a* are different from those of the second light emitting element 32*b*.

The selecting unit 56 selects either of the light emitting elements 32 to be supplied with the input signal based on the phase shift resolution and/or the phase shift range of the phase modulation in the phase modulation circuit 30. The selecting unit 56 may include a characteristics table memory for storing a characteristics table which indicates the phase shift resolution and the phase shift range for each of the light emitting elements 32. The selecting unit 56 selects either of the light emitting elements 32 to be supplied with the input signal based on the characteristics table. According to the phase modulation circuit 30 of this embodiment, it is possible to easily generate the phase of desired resolution. In addition, it is possible to easily generate the phase of a wide range.

FIG. 8 shows an example of the characteristics table. The characteristics table memory stores the characteristics table as shown in FIG. 8. The characteristics table indicates the phase shift resolution and the phase shift range of each of the plurality of light emitting elements 32.

Figure 9:
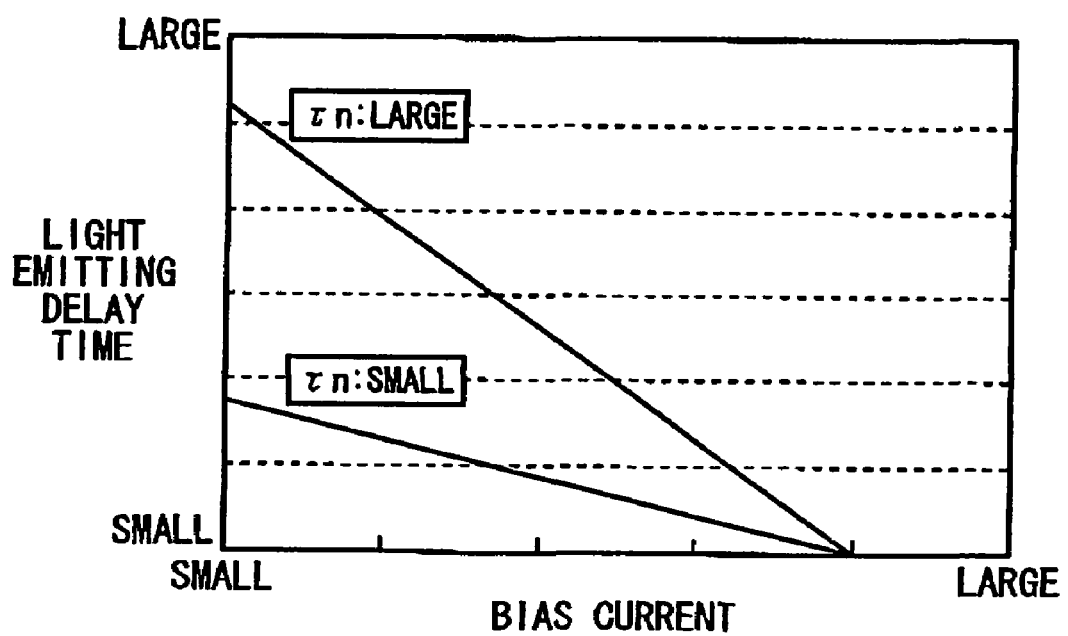
FIG. 9 shows the relation between the bias current and an interband transition time constant $\tau_n$ of the light emitting element 32 and the light emission delay time.

FIG. 9 shows the relation between the bias current and the interband transition time constant $\tau_n$ of the light emitting element 32 and the light emission delay time. In FIG. 9, the horizontal axis represents the bias current, and the vertical axis represents the light emission delay time. In the phase modulation circuit 30 described in connection with FIG. 7, by selecting either of the light emitting elements 32 whose interband transition time constants $\tau_n$ are different, the phase of the input signal is modulated with desired phase shift resolution and a phase shift range. As shown in FIG. 9, if the interband transition time constant $\tau_n$ is large, the phase shift range of the light emitting element 32 increases. And in case that the bias current is changed with a predetermined gray scale and the phase of the input signal is shifted, if the interband transition time constant becomes large, the phase shift amount of the bias current per each gray scale increases. That is, by selecting either of the light emitting elements 32 whose interband transition time constants $\tau_n$ are different, it is possible to control the phase shift resolution and the phase shift range of the phase modulation circuit 30.

Figure 10:
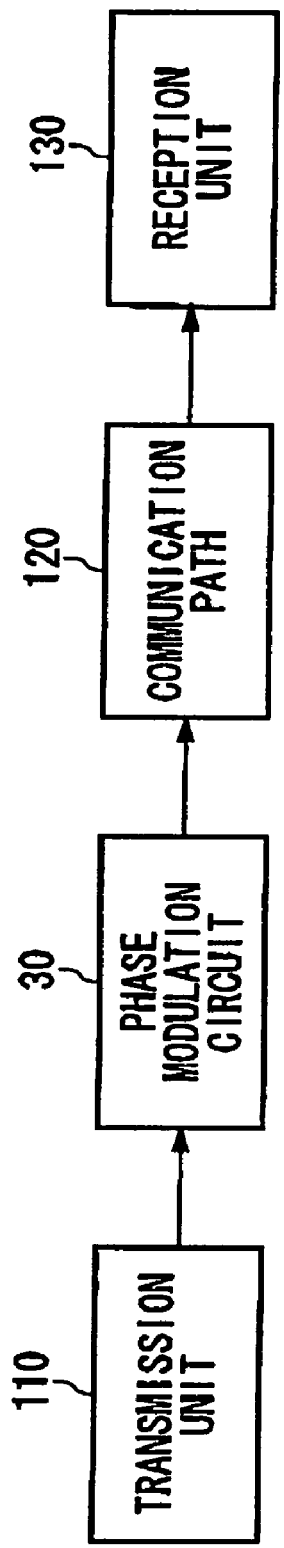
FIG. 10 shows an example of the configuration of a communication system 200 related to this embodiment.

FIG. 10 shows an example of the configuration of a communication system 200 related to this embodiment. The communication system 200 transmits the communication data in a phase modulation method. The communication system 200 is provided with a transmission unit 110, a phase modulation circuit 30, a communication path 120, and a receiving unit 130. The communication system 200 may transmit voice information, text information, image information, etc. in the form of digital data.

The transmission unit 110 outputs the communication data. The phase modulation circuit 30 receives the communication data from the transmission unit 110 and modulates the phase of the communication data received to a desired phase. The phase modulation circuit 30 may have the same or similar function and configuration as the phase modulation circuit 30 described in relation to FIG. 2. The communication path 120 transmits the communication data phase-modulated by the phase modulation circuit 30 to the receiving unit 30. The communication path 120 may be either a wire or wireless path. The phase modulation circuit 30 outputs the communication data in response to the characteristics of the communication path 120. The receiving unit 130 receives the communication data phase-modulated by the phase modulation circuit 30 and demodulates the communication data received.

In the communication system 200 according to this embodiment, a carrier wave to be modulated is supplied to the transistor 52 of the phase modulation circuit 30. As the bias current control unit 38 is given phase setting data corresponding to the digital data to be overlapped on the carrier and controls the bias current source 34 based on the phase setting data, it is possible to generate the phase signal resulting from modulating the phase of the carrier. That is, as the bias current control unit 38 is given the phase setting data whose value changes in response to the digital data to be overlapped and controls the bias current control unit 38 in real time based on the phase setting data, it is possible to generate the phase signal resulting from modulating the phase of the carrier.

In the communication system 200 according to this embodiment, by controlling the phase of the leading edge of the waveform of the carrier wave, it is possible to overlap the multi-value phase information corresponding to the digital data on the leading edge of the waveform of the carrier wave. Accordingly, it is possible to easily generate the signal with the multi-value information within one data rate with regard to the carrier wave.

And the communication system 200 may transmit the communication data in parallel transmission. In this case, the transmission unit 110 outputs the communication data in parallel, and the phase modulation circuit 30 modulates the phase of each communication data to a desired phase. And the communication path 120 includes a plurality of paths, and the receiving unit 130 demodulates each communication data.

Figure 11:
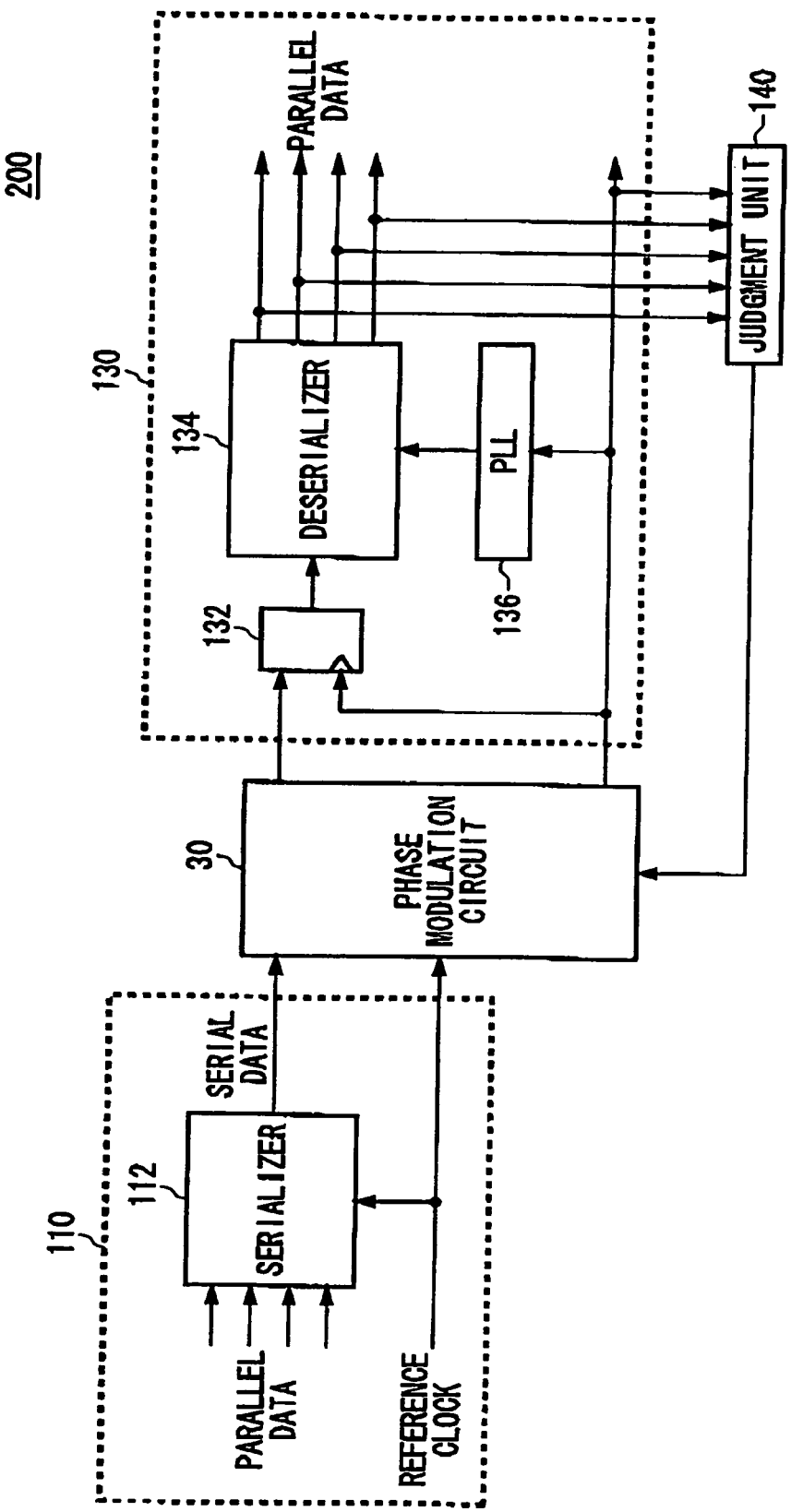
FIG. 11 shows another example of the configuration of the communication system 200.

FIG. 11 shows another example of the configuration of the communication system 200. The communication system 200 according to this embodiment converts the parallel data into the serial data in the transmission unit 110 and performs data transmission to the receiving unit 130 in a clock synchronization method, by which data is transmitted being synchronized with a reference clock. The communication system 200 is provided with a transmission unit 110, a phase modulation circuit 30, a receiving unit 130, and a judgment unit 140. The configuration elements in this embodiment given the same symbols as those in FIG. 10 have the same or similar function and configuration as the elements described in connection with FIG. 10.

The receiving unit 110 includes a serializer 112 for converting the parallel data, which is to be transmitted, into the serial data. The serializer 112 receives the parallel data and converts it into the serial data based on a given reference clock.

The phase modulation circuit 30 receives the serial data and the reference clock, modulates the phase of the reference clock and transmits it to the receiving unit 130. The detail operation of the phase modulation circuit 30 will be described later in connection with FIG. 12.

The receiving unit 130 includes a latch circuit 132, a deserializer 134, and a PLL (Phase Lock Loop) 136. The receiving unit 130 may include a DLL (Delay Lock Loop) or other multi-phase clock generating unit in place of the PLL 136. The latch circuit 132 receives the serial data from the phase modulation circuit 30, holds the value of the serial data based on the reference clock phase-modulated, and supplies the value to the deserializer 134. At this time, in order to hold the value of the serial data with high precision in the latch circuit 132, the phase modulation circuit 30 modulates the phase of the reference clock. In other words, the phase modulation circuit 30 modulates the phase of the reference clock in order that the timing of the rising edge of each waveform of the reference clock lies between the timing of the rising edge and the falling edge of the corresponding data.

At this time, the phase modulation circuit 30 preferably performs calibration before the data transmission and calculates the phase shift amount of the reference clock in advance so as to properly modulate the phase of the reference clock. The bias current control unit 38 of phase modulation circuit 30 controls the bias current of the bias current source 34 based on the phase shift amount calculated in advance to modulate the phase of the reference clock.

The PLL 136 generates a multi-phase clock synchronized with the reference clock based on the reference clock and supplies it to the deserializer 134. The deserializer 136 receives the serial data from the latch circuit 132 and converts it into the parallel data according to the multi-phase clock.

Then, the calibration for calculating the proper phase shift amount of the reference clock in the phase modulation circuit 30 will now be described. In the calibration, the judgment unit 140 calculates the phase shift amount of the reference clock according to the output result of the deserializer 134.

The judgment unit 140 judges whether an error occurs or not in the parallel data outputted by the deserializer 134, and the proper phase shift amount of the reference clock of the phase modulation circuit 30 is calculated on the basis of the judgment result. For example, by sending the data for calibration having a predetermined pattern to the transmission unit 110 and comparing the data for calibration with the parallel data outputted by the deserializer 134, the phase shift amount of the phase modulation circuit 30 is calculated. For instance, the phase modulation circuit may sequentially change the phase shift amount of the reference clock, find the upper and lower limit values of the phase shift amount at which an error is detected in the judgment unit 140, and calculate the intermediate value between the upper and lower limit values as the proper phase shift amount. The judgment unit 140 makes the bias current control unit 38 of the phase modulation circuit 30 control the bias current based on the phase shift amount calculated.

And if the timing error between the serial data and the reference clock changes according to a time sequence, the phase of the rising edge timing of the reference clock may be controlled in real time, as a phase comparator for comparing the phases of the serial data and the reference clock is provided to the receiving unit 130 and the information indicating that the phase is relatively early and/or indicating late is detected, so that the feedback control is performed in the bias current control unit 38.

According to the communication system 200 related in this embodiment, by controlling the bias current of the bias current source 34b, it is possible to eliminate the effect of the timing error between the data and the reference clock due to the skew, noise, etc. in the transmission path. Therefore, the receiving unit 130 can highly precisely receive the data using an extremely easy and simple circuit.

Figure 12:
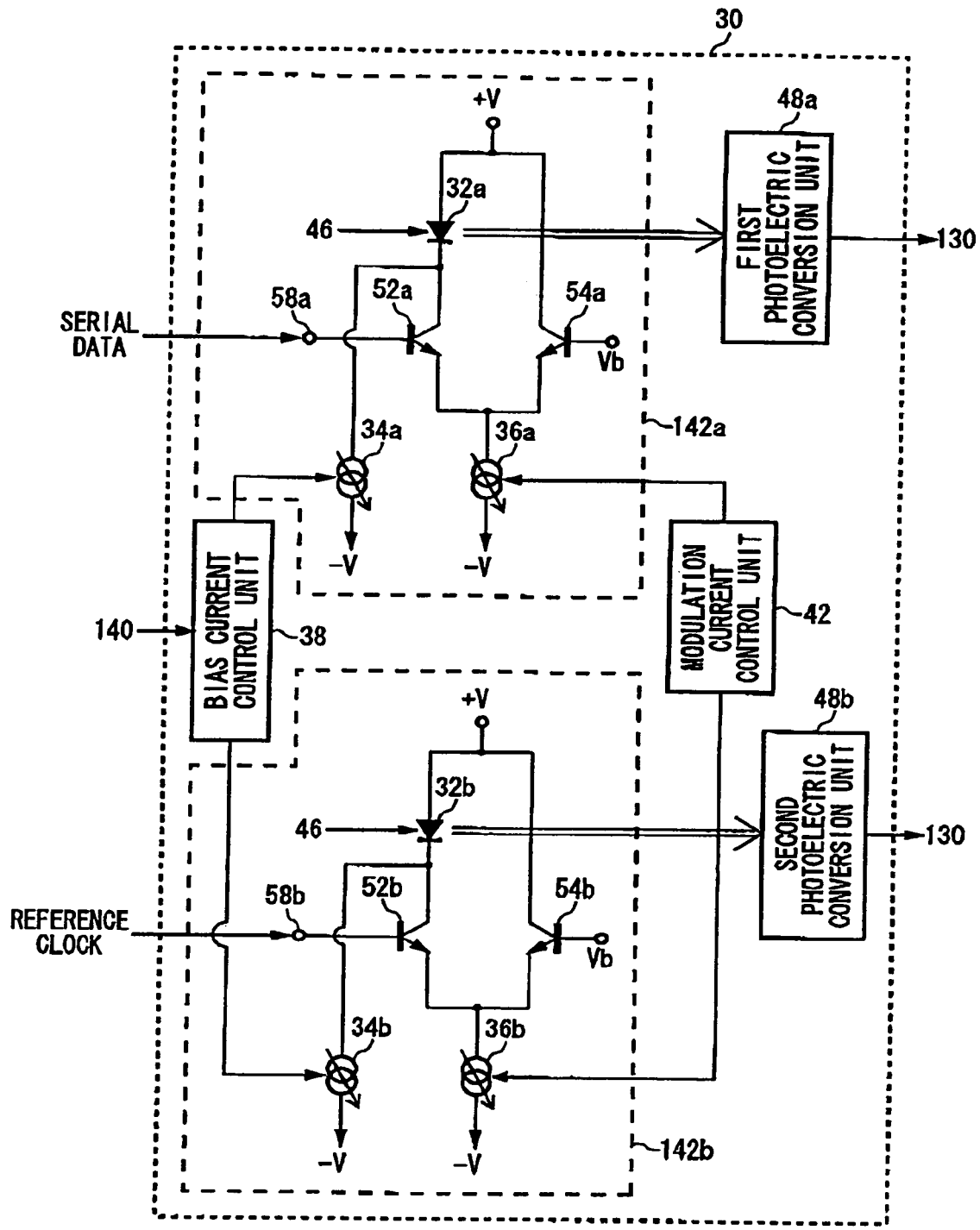
FIG. 12 shows an example of the configuration of a phase modulation circuit 30.

FIG. 12 shows an example of the configuration of the phase modulation circuit 30. The matters in FIG. 12 given the same symbols as those in FIG. 7 have the same or similar function and configuration as the matters described in connection with FIG. 7. The phase modulation circuit 30 includes a plurality of phase shifting units 142, a plurality of photoelectric conversion units 48, a bias current control unit 38, and a modulation current control unit 42. In this embodiment, the phase modulation circuit 30 includes a first phase shifting unit 142a, a second phase shifting unit 142b, a first photoelectric conversion unit 48a, and a second photoelectric conversion unit 48b.

Each of the plurality of phase shifting units 142 includes a light emitting element 32, transistors (52, 54), a bias current source 34, and a modulation current source 36. The interband transition time constants $\tau_n$ of the light emitting elements 32 of the plurality of phase shifting units 142 may be either the same or different. The bias current control unit 38 independently controls each of the bias currents of the bias current sources 34 in the plurality of phase shifting units 142. And the modulation current control unit 42 independently controls each of the modulation currents of the modulation current sources 36 in the plurality of phase shifting units 142. In other words, the phase modulation processes in the plurality of phase shifting units 142 are independently controlled, so that each of the plurality of phase shifting units 142 can modulate the phase of the communication data to a desired phase with desired phase shift resolution and a phase shift range.

In this embodiment, the phase shifting unit 142a receives the serial data described in connection with FIG. 11, and the phase shifting unit 142b receives the reference clock described in connection with FIG. 11. And the bias current control unit 38 controls the bias current of the bias current source 34b based on the phase shift amount calculated by the judgment unit 140 described in connection with FIG. 11. And the phase shifting unit 142a may not have the phase modulation function. For example, it may be configured as a circuit for fixing the bias current of the bias current source 34a. In this case, it preferably sets the bias current to be sufficiently larger than the light emitting threshold current in order that the phase shift amount of the phase shifting unit 142a becomes approximately zero, i.e. the light emission delay time of the light emitting element 32a becomes approximately zero.

The phase shifting unit 142a converts the serial data received into an optical signal and supplies it to the first photoelectric conversion unit 48a. The first photoelectric conversion unit 48a converts the optical signal received into an electrical signal and supplies it to the receiving unit 130. And the phase modulation circuit 30 may supply the serial data received to the receiving unit 130 without the phase shifting unit 142a and the first photoelectric conversion unit 48a.

The phase shifting unit 142b modulates and converts the phase of the reference clock received into an optical signal and supplies it to the second photoelectric conversion unit 48b. The second photoelectric conversion unit 48b converts the optical signal received into an electrical signal and supplies it to the receiving unit 130.

And the first and second photoelectric conversion units 48a and 48b may be provided in the receiving unit 130. In this case, the phase shifting units 142a and 142b supply the optical signals converted to the first and second photoelectric conversion units 48a and 48b of the receiving unit 130 via a communication path such as an optical fiber.

Figure 13:
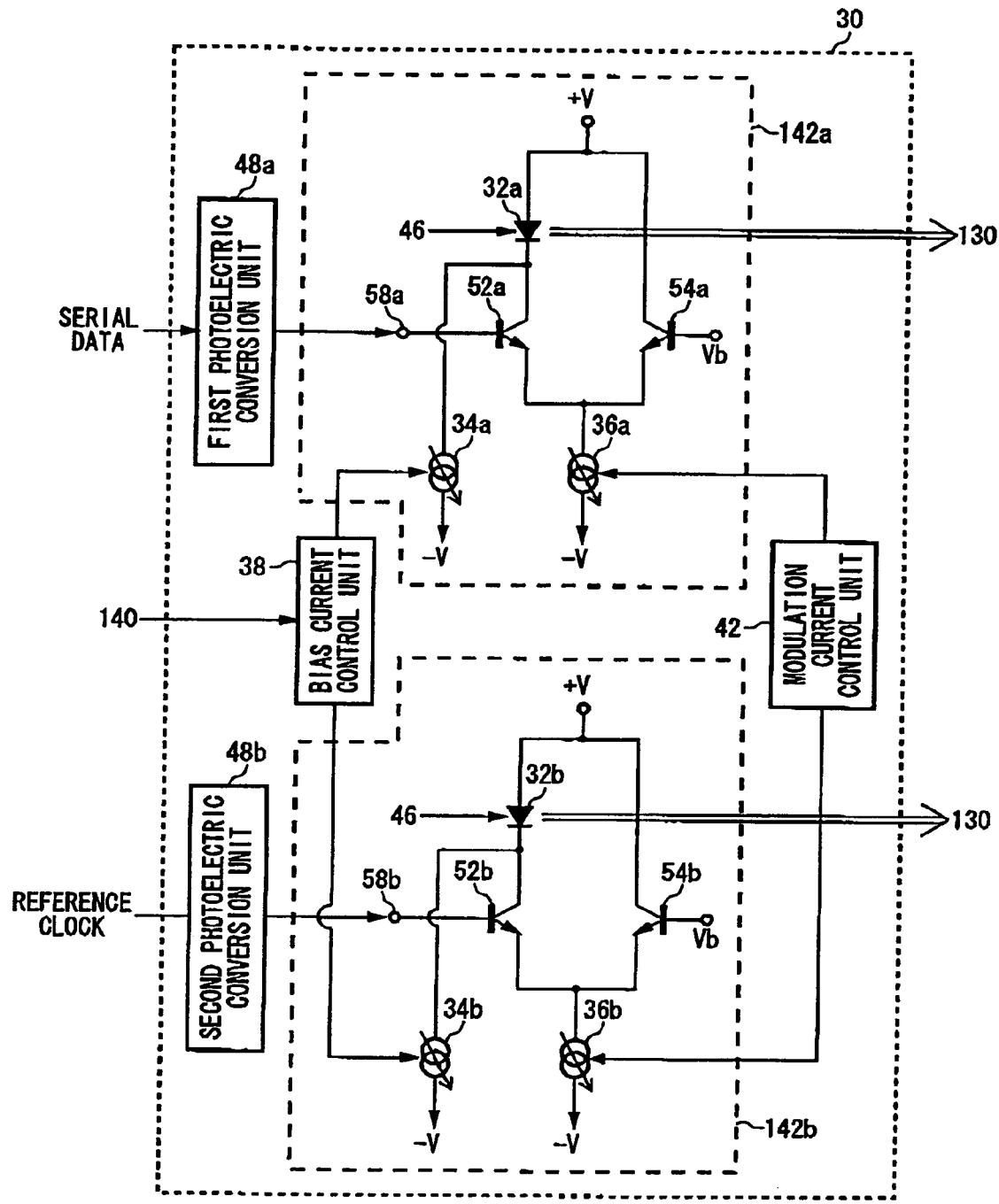
FIG. 13 shows another example of the configuration of the phase modulation circuit 30.

FIG. 13 shows another example of the configuration of the phase modulation circuit 30. The matters in FIG. 13 given the same symbols as those in FIG. 12 have the same or similar function and configuration as the matters described in relation to FIG. 12. In this embodiment, the transmission unit (see FIG. 11) outputs an optical signal as the communication data. The phase modulation circuit 30 includes a photoelectric conversion unit 48 for converting the communication data of an optical signal into the communication data of an electrical signal. And the light emitting element 32 emits light according to the communication data converted into the electrical signal in the photoelectric conversion unit 48.

According to the phase modulation circuit 30 related to this embodiment, it is possible to easily modulate the phase of an optical signal to a desired phase in the same way as the phase of the electrical signal is modulated.

Although the present invention has been described by way of exemplary embodiments, it should be understood that those skilled in the art might make many changes and substitutions without departing from the spirit and the scope of the present invention, which is defined only by the appended claims.

As obvious from the description above, according to the phase modulation circuit related to the present invention, it is possible to easily modulate the phase of an input signal to a desired phase. In addition, it is possible to easily perform the phase modulation with desired phase shift resolution and a desired phase shift range. Further, according to the test apparatus related to the present invention, it is possible to easily perform the test of an electronic device. Further, according to the communication system related to the present invention, it is possible to easily perform the modulation of the communication data and transmit it.

What is claimed is:

1. A phase modulation circuit for outputting a modulation signal, which results from modulating a phase of an input signal to a desired phase, comprising:
   a first light emitting element for emitting light according to said input signal and outputting a light emitting signal as said modulation signal; and
   a first bias current source for supplying in advance said first light emitting element with a bias current, which is smaller than a light emitting threshold current whereby said first light emitting element starts to emit light.

2. A phase modulation circuit as claimed in claim 1, further comprising:
   a bias current control unit for controlling said bias current of said bias current source based on said desired phase.

3. A phase modulation circuit as claimed in claim 1, further comprising:
   a modulation current source for supplying said first light emitting element with a modulation current to make said first light emitting element emit light according to said input signal; and
   a modulation current control unit for controlling said modulation current of said modulation current source based on a phase modulation resolution of said phase modulation circuit.

4. A phase modulation circuit as claimed in claim 3, wherein said modulation current control unit controls said modulation current of said modulation current source further based on a variable phase modulation range of said phase modulation circuit.

5. A phase modulation circuit as claimed in claim 2, wherein said bias current control unit controls said bias current of said bias current source further based on temperature of said first light emitting element.

6. A phase modulation circuit as claimed in claim 1, further comprising:
   a temperature control unit for heating or cooling said first light emitting element.

7. A phase modulation circuit as claimed in claim 6, wherein said temperature control unit heats or cools said first light emitting element based on a variable phase modulation range of said phase modulation circuit.

8. A phase modulation circuit as claimed in claim 1, further comprising:
   a photoelectric conversion unit for converting said light emitting signal outputted by said first light emitting element into an electrical signal and outputting said electrical signal as said modulation signal.

9. A phase modulation circuit as claimed in claim 1, further comprising:
   a second light emitting element, whose interband transition time constant is different from said first light emitting element, for emitting light according to said input signal and outputting a light emitting signal as said modulation signal; and
   a second bias current source for supplying in advance said second light emitting element with a bias current, which is smaller than a light emitting threshold current whereby said second light emitting element starts to emit light.

10. A phase modulation circuit as claimed in claim 9, wherein said first and second light emitting elements are laser diodes, and
   base materials of said first and second light emitting elements are different.

11. A phase modulation circuit as claimed in claim 9, further comprising:
   a selecting unit for supplying said input signal to either said first or second light emitting element based on said desired phase.

12. A phase modulation circuit as claimed in claim 9, wherein said first and second light emitting elements receive first and second corresponding input signals and output said modulation signals according to said input signals received respectively.

13. A test apparatus for testing an electronic device, comprising:
- a pattern generating unit for generating a test signal to test said electronic device;
- a phase modulation circuit for supplying said electronic device with a modulation signal, which results from modulating a phase of said test signal to a desired phase; and
- a judgment unit for judging quality of said electronic device based on an output signal, which said electronic device outputs based on said modulation signal,
- wherein said phase modulation circuit comprises:
  - a first light emitting element for emitting light according to said test signal and outputting a light emitting signal as said modulation signal; and
  - a bias current control unit for supplying in advance said first light emitting element with a bias current, which is smaller than a light emitting threshold current whereby said first light emitting element starts to emit light.

14. A communication system for transmitting communication data, comprising:
- a transmission unit for outputting said communication data;
- a phase modulation circuit for receiving said communication data and modulating a phase of said communication data to a desired phase;
- a communication path for transmitting said communication data phase-modulated by said phase modulation circuit; and
- a receiving unit for receiving said communication data phase-modulated by said phase modulation circuit and demodulating said communication data received,
- wherein said phase modulation circuit comprises:
  - a first light emitting element for emitting light according to said communication data received and outputting a light emitting signal as said communication data phase-modulated; and
  - a first bias current source for supplying in advance said first light emitting element with a bias current, which is smaller than a light emitting threshold current whereby said first light emitting element starts to emit light.

15. A communication system as claimed in claim 14,
- wherein said transmission unit outputs an optical signal as said communication data,
- said phase modulation circuit further comprises a photoelectric conversion unit for converting said communication data of an optical signal into said communication data of an electrical signal, and
- said first light emitting element emits light according to said communication data of an electric signal.

* * * * *